Aug. 22, 1961 R. O. WILSON 2,996,738
MACHINE FOR ASSEMBLING O-RINGS ON DEPENDING BOLT SHANKS
Filed April 20, 1959 7 Sheets-Sheet 6
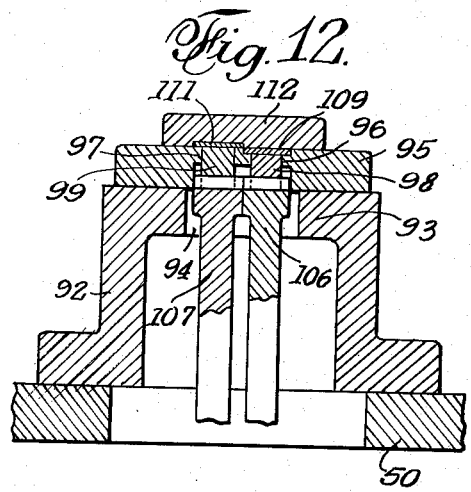
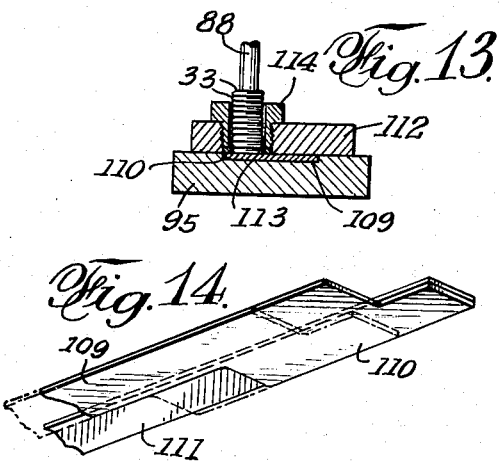
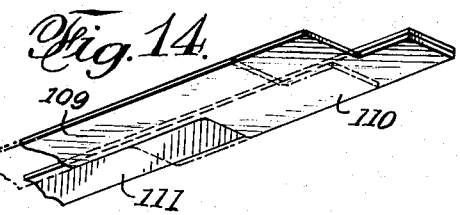
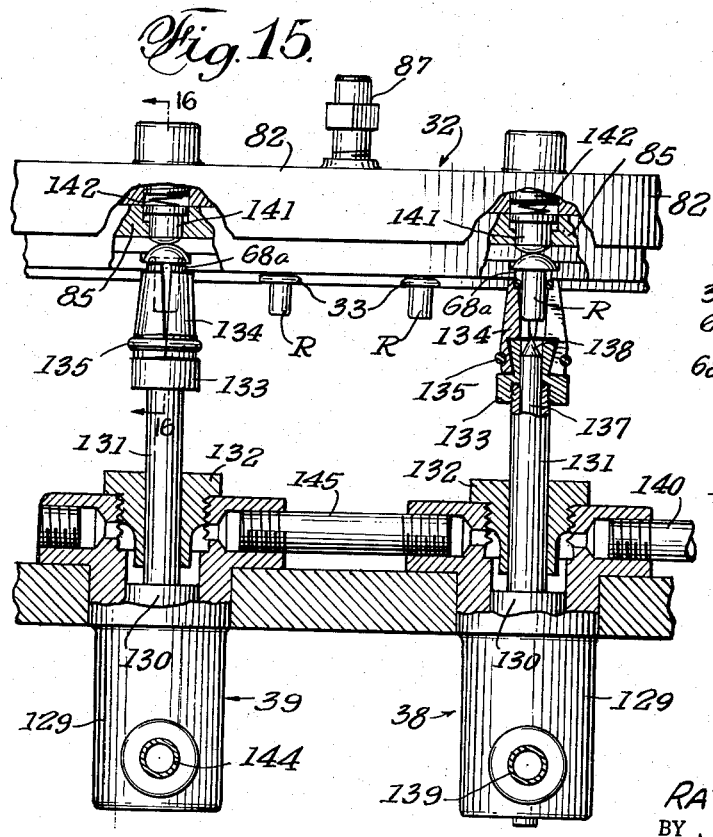
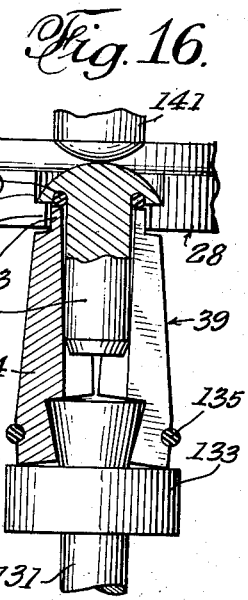
INVENTOR.
RAYMOND O. WILSON
BY C. E. Stratton
ATTORNEY Aug. 22, 1961    R. O. WILSON    2,996,738
MACHINE FOR ASSEMBLING O-RINGS ON DEPENDING BOLT SHANKS
Filed April 20, 1959    7 Sheets-Sheet 7
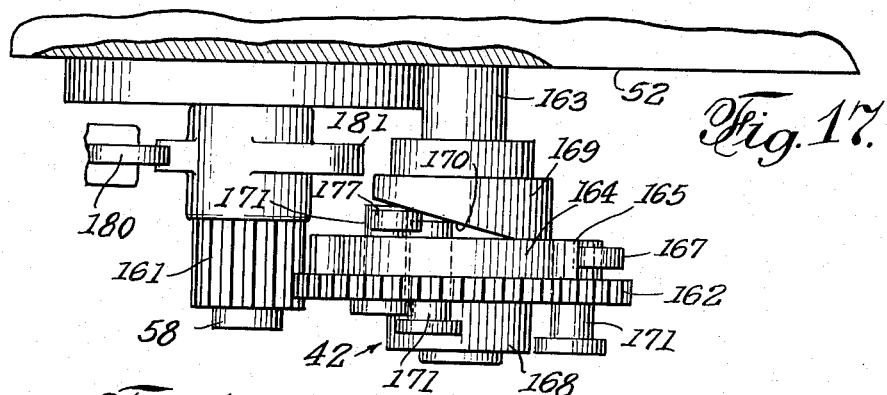
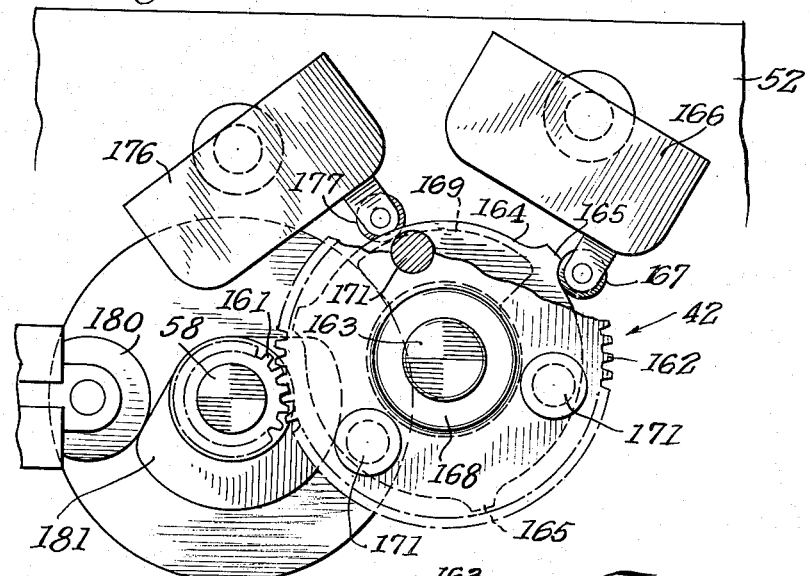
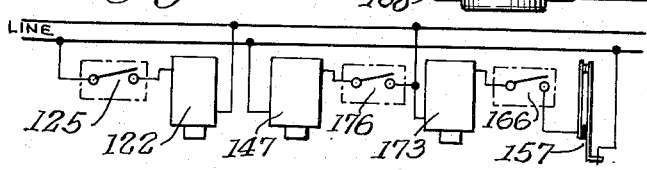
INVENTOR.
RAYMOND O. WILSON
BY C. T. Stratton
ATTORNEY United States Patent Office 2,996,738
Patented Aug. 22, 1961

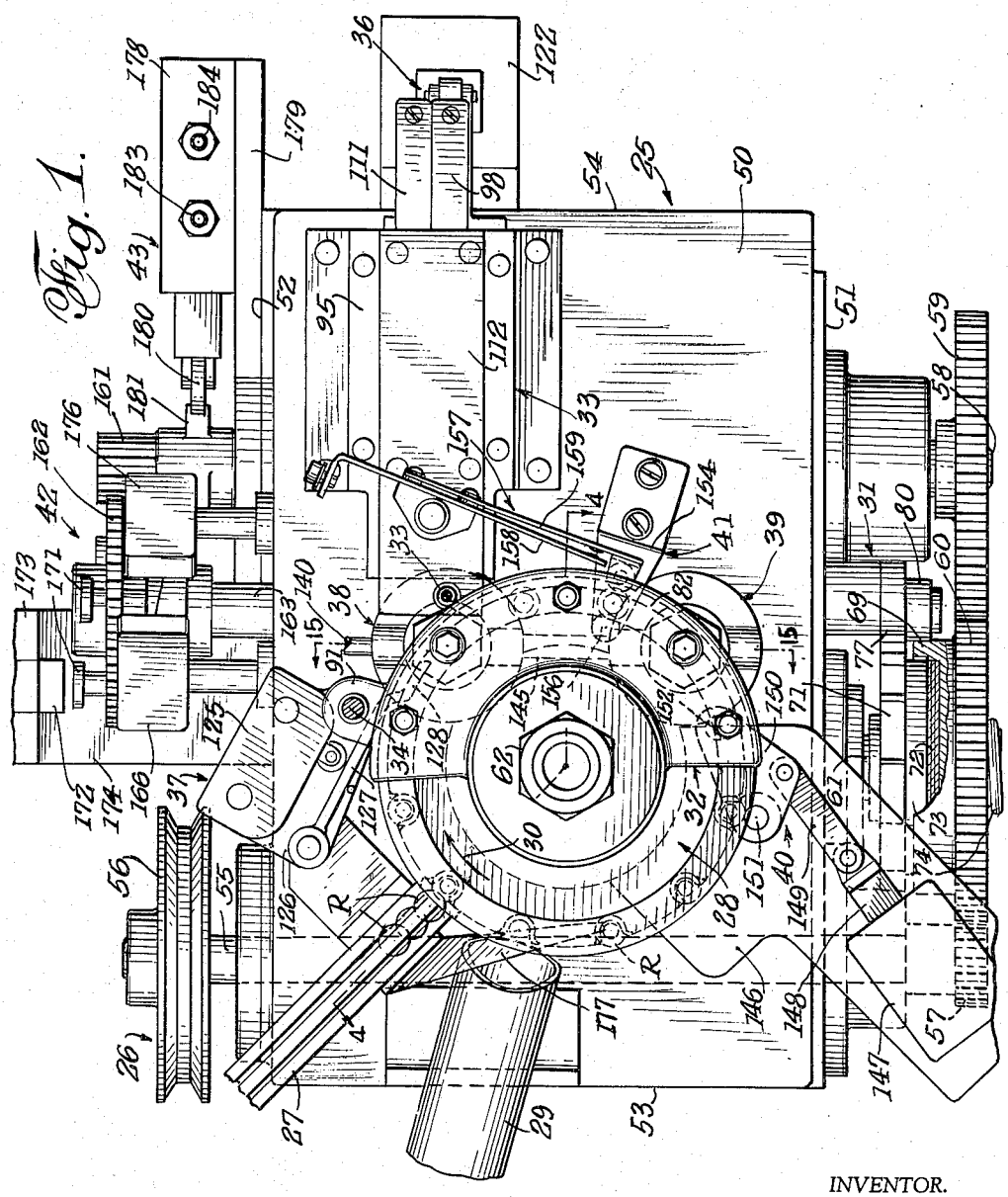

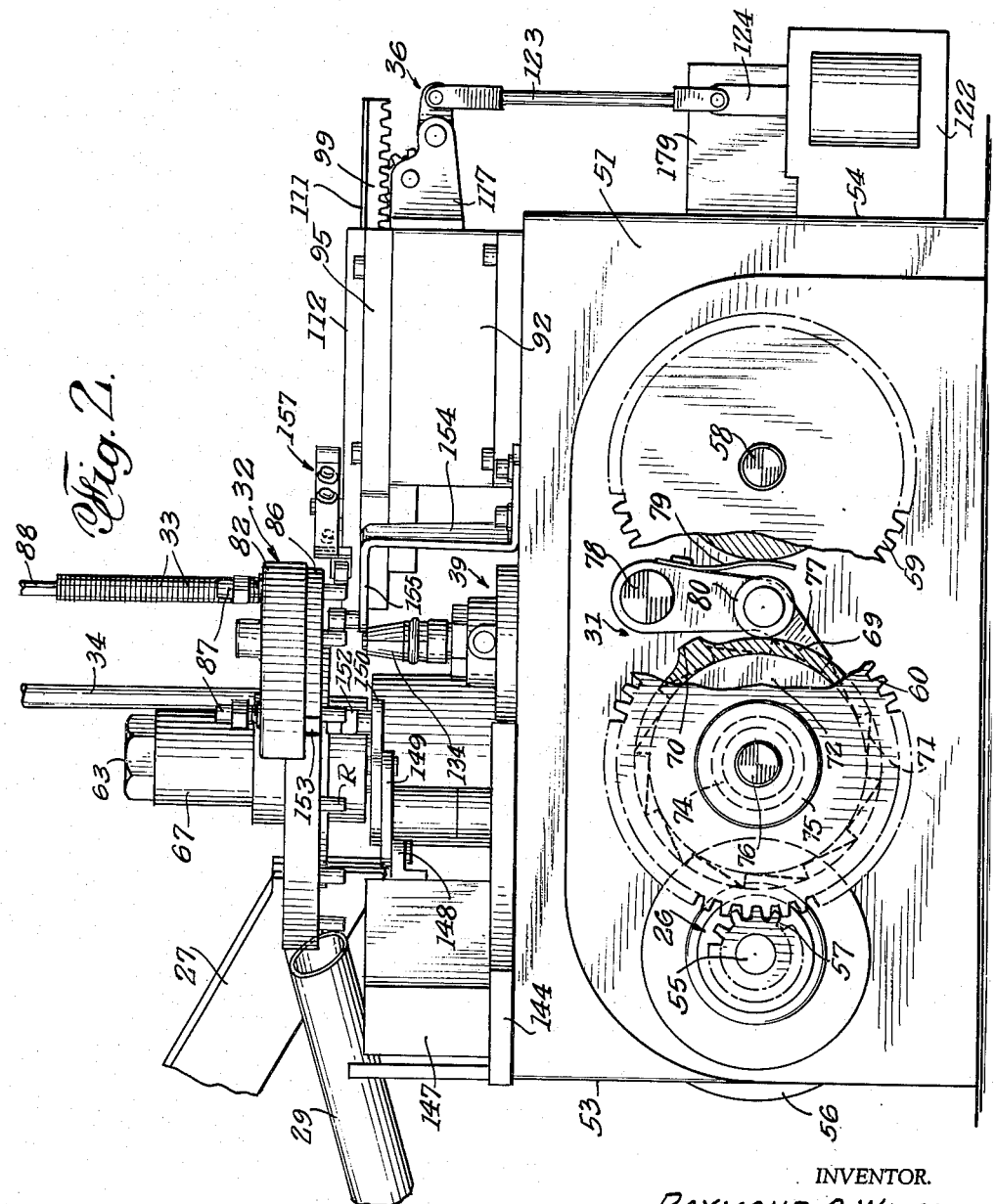

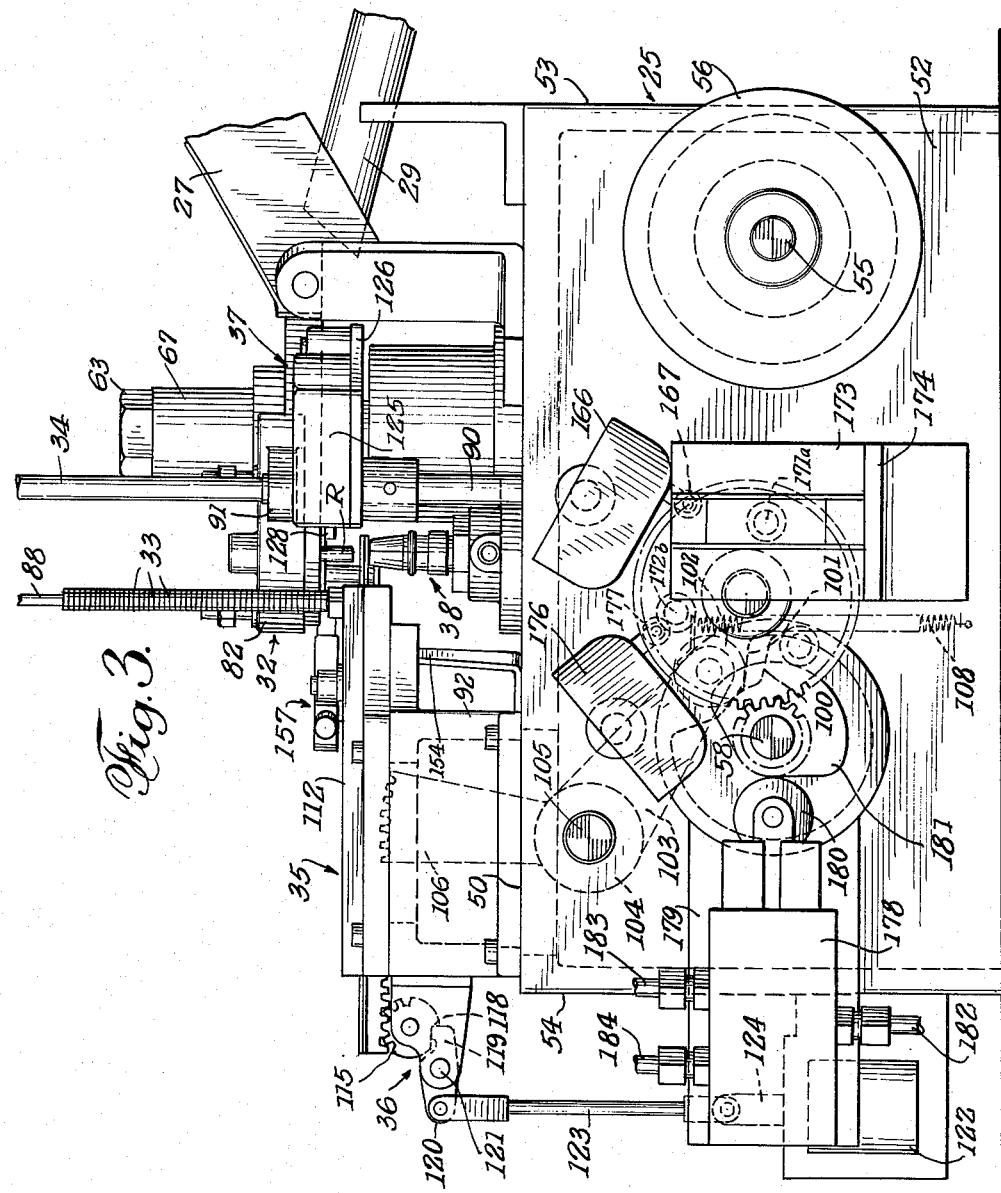

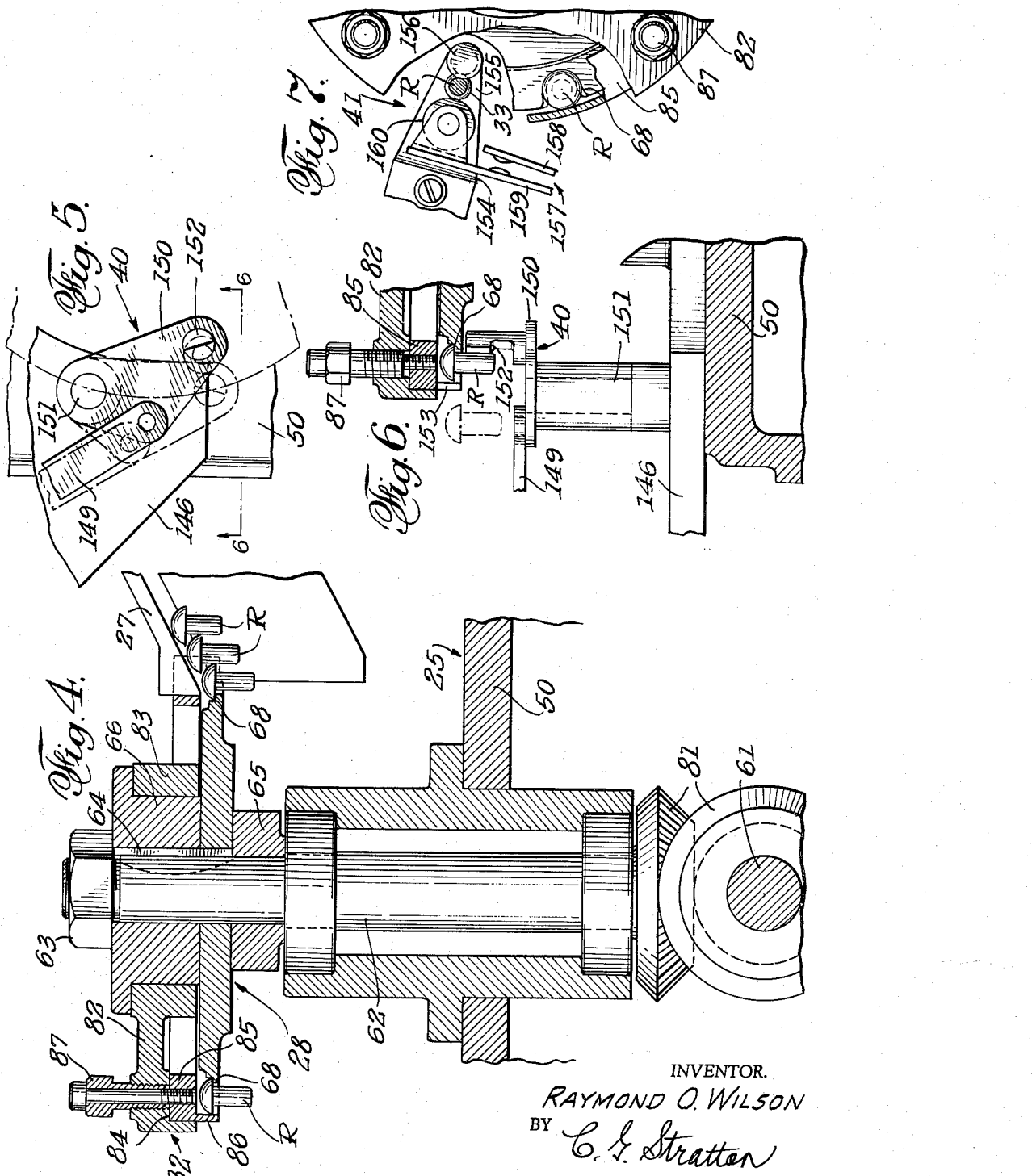

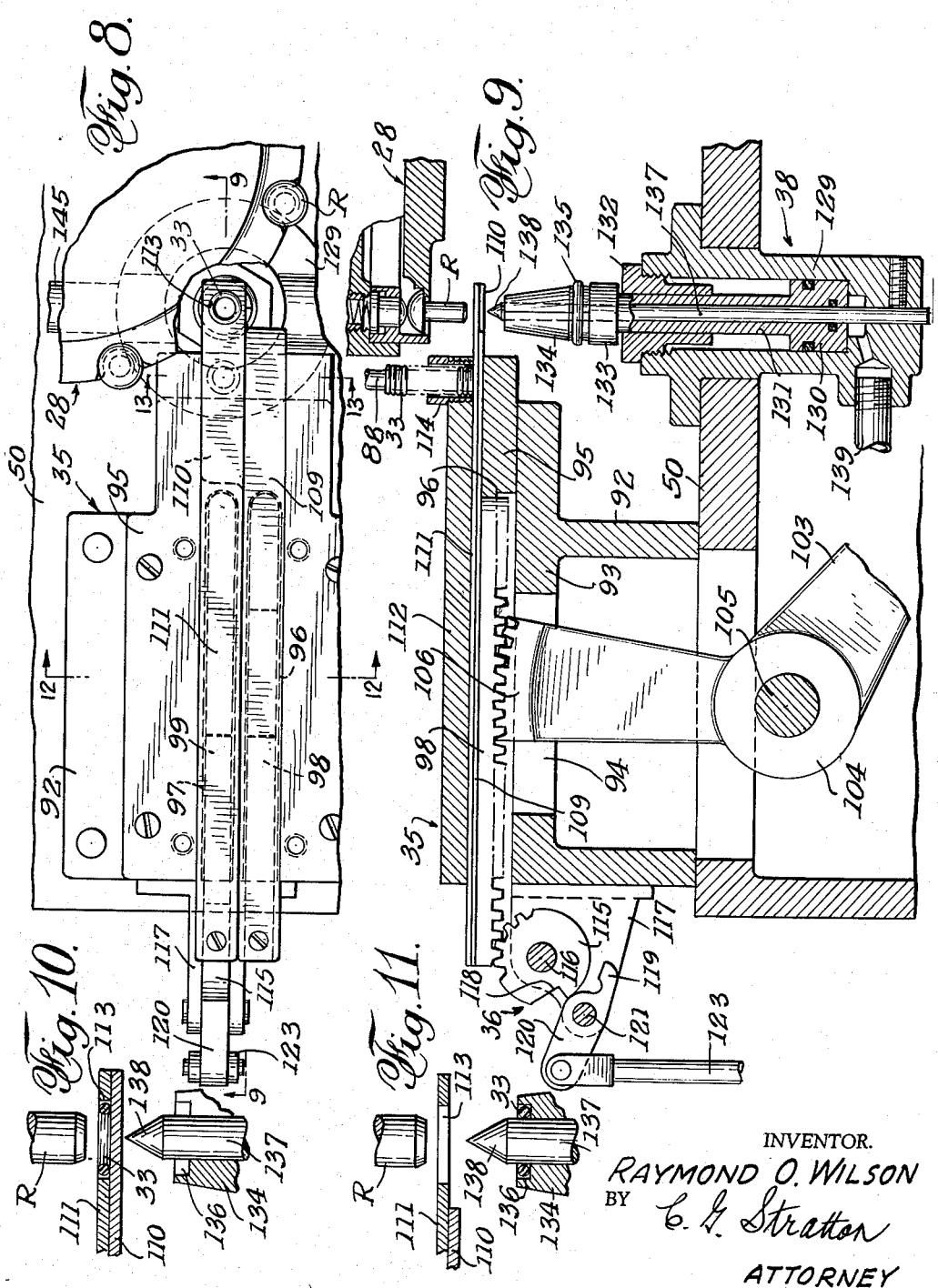

2,996,738
MACHINE FOR ASSEMBLING O-RINGS ON DEPENDING BOLT SHANKS
Raymond O. Wilson, San Marino, Calif., assignor to Olympic Screw & Rivet Corporation, Downey, Calif., a corporation of California
Filed Apr. 20, 1959, Ser. No. 807,577
18 Claims. (Cl. 10—155)

This invention relates to a machine for assembling an O-ring in an annular groove provided in the under face of a rivet head.

Heretofore, such O-rings were assembled by hand at a relatively slow production pace. The present invention has for an object to so coordinate the feed movements of a rivet and an O-ring toward each other that feed of the latter occurs only when the feed of a rivet is normal, thereby obviating loss of O-rings due to the absence of rivets at the station or point of assembly.

Inasmuch as such rivets and O-rings may be quite small and assembly rendered difficult if the rivets are not accurately held at the assembly station, it is another object of the invention to provide a novel and improved rivet carrier that may be accurately adjusted to hold rivets properly positioned during feed and particularly at the assembly station.

A further object of the invention is to provide an assembly machine of the character referred to which provides means to test whether a rivet is being properly fed and to provide the same with an O-ring, accordingly.

A still further object of the invention is to provide an assembly machine that ejects rivets lacking O-rings, thereby insuring that only properly assembled rivets are delivered to the discharge end of the machine.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 1 is a top plan view of an assembly machine according to the present invention.

FIG. 2 is a partly broken front elevational view thereof.

FIG. 3 is a rear elevational view.

FIG. 4 is an enlarged vertical sectional view as taken on the line 4—4 of FIG. 1.

FIG. 5 is a fragmentary plan view of rivet-ejecting means used in the present machine.

FIG. 6 is a vertical sectional view as taken on the line 6—6 of FIG. 5.

FIG. 7 is a fragmentary and partly broken plan view of means for testing whether a rivet has been properly provided with an O-ring.

FIG. 8 is a fragmentary plan view of O-ring feeding means used in the present machine.

FIG. 9 is a longitudinal sectional view as taken on the line 9—9 of FIG. 8.

FIGS. 10 and 11 are further enlarged fragmentary sectional views showing two stages of feed of an O-ring with relation to a rivet onto which said ring is to be assembled.

FIG. 12 is a cross-sectional view as taken on the line 12—12 of FIG. 8.

FIG. 13 is a cross-sectional view as taken on the line 13—13 of FIG. 8.

FIG. 14 is a fragmentary perspective view, as seen from beneath, of O-ring feeding members shown in FIGS. 8 to 13.

FIG. 15 is a cross-sectional view as taken on the line 15—15 of FIG. 1, with portions shown in elevation.

FIG. 16 is an enlarged vertical sectional view as taken on the line 16—16 of FIG. 15.

FIG. 17 is a plan view of means for controlling actuation of the rivet ejection means.

FIG. 18 is a partly broken elevational view thereof.

FIG. 19 is a cross-sectional view of said means shown in FIGS. 17 and 18.

FIG. 20 is a wiring diagram of the electrical components of the machine.

The present O-ring assembly machine comprises, generally, a base 25, a continuously operating drive 26 mounted on said base, a chute 27 for supplying rivets R, in one-by-one sequence, to the machine, an indexing disc 28 that receives rivets from the chute 27 and moves the same intermittently toward a discharge chute 29 in the direction of arrow 30, an intermittent drive 31 between the continuous drive 26 and the disc 28, hold-down means 32 for the rivets carried by the disc 28, a supply of O-rings 33 and a support 34 therefor, feed mechanism 35 for transferring O-rings from said supply into register with the rivets R as the latter are intermittently fed, means 36 normally locking said feed mechanism 35, means 37 for operating the means 36 to release position so that the mechanism 35 can carry out an O-ring feed operation, means 38 to push an O-ring onto the shank of a registering rivet, means 39 to simultaneously push the O-ring on another rivet into the groove in the under face of the rivet head, means 40 to eject rivets lacking O-rings, means 41 to operate the means 40 only when a rivet is lacking an O-ring, means 42 controlling the operation of the means 40 by the means 41 so that testing for an O-ring on the rivet may occur between the stations where the means 38 and 39 push O-rings and discharge of a rivet lacking an O-ring may occur beyond the station where the means 39 operates, and means 43 for controlling a supply of compressed air for operating the means 38 and 39.

The base 25 is preferably rectangular being formed to have a top wall 50, a front wall 51, a rear wall 52, and end walls 53 and 54. Said base is preferably interiorly hollow.

The continuously operating drive 26 is shown as a shaft 55 that is carried in bearings provided in walls 51 and 52 and extends across the base between said walls. The rear end of said shaft is provided with a pulley 56 that may be belt driven. The front end of said shaft extends outward of the front of base 25 and is provided with a pinion gear 57.

Said drive 26 further includes a shaft 58 that extends between the walls 51 and 52 of the base parallel to the shaft 55. Said shafts 55 and 58 are connected by said gear 57, a gear 59 on the shaft 58 and an idler gear 60 in mesh with both gears 57 and 59. The gears 59 and 60 are the same size for reasons later apparent. The gear 60 has a free rotational mount on a shaft 61 that also has bearing in base walls 51 and 52 and extends across the interior of said base between said walls.

The chute 27 comprises typical means that may be fed from a revolving hopper to feed rivets R to the feed disc 28 by suspending said rivets by their enlarged heads in such manner that the rivet shanks are pendant, as may be seen in FIG. 4. Said chute 27 is preferably disposed on the extension of a radius of said disc so that the rivets are brought to the edge of the disc in the pendant position mentioned.

The indexing disc 28 is carried by a vertical shaft 62, is secured to said shaft, as by a nut 63, and is held against relative rotation with respect to the shaft by a key 64. Said disc is shown as clamped between a collar 65 and a bearing block 66. While FIGS. 2 and 3 show position-releasing sleeve extensions 67 above the block 66, the same may be omitted and, as shown in FIG. 4, the nut 63 used to directly press upon the block 66.

The disc 28 is provided with a complement of uniformly spaced peripheral seats 68 in which rivets R are received from the chute. Said seats are desired to have a nice fit with the rivet head but, as may be best seen in FIGS 15 and 16, these seats are substantially larger than the rivet shanks to provide an annular clearance between said shanks and rivet seats. The disc 28 that is illustrated has a complement of twelve seats 68. Accordingly, the intermittent drive 31 feeds the disc in increments of one-twelfth of a revolution from station to station until a rivet fed by the chute 27 reaches the discharge chute 29, providing that an O-ring has been properly placed on said rivet.

The intermittent drive 31 has the mentioned gear 60 as the prime mover. Said gear is provided with a recessed hub 69 on which is provided a radially projecting lug 70. A ratchet wheel 71 is affixed to the mentioned shaft 61, and friction packing 72 is disposed in the recess of hub 69 and in flatwise engagement with a hub 73 of the ratchet wheel 71. Friction between the ratchet wheel and gear 60 is created by means of a compression spring 74 that biases said gear toward the ratchet wheel by resilient pressure imposed by a nut or knob 75 on an extension 76 of the shaft 61. It will be clear that, when the ratchet wheel is free to turn, the friction between gear 60 and said ratchet will cause said gear to turn shaft 61.

Ordinarily, however, the ratchet wheel is held against rotation by a pawl 77 on a pivot 78 on the base wall 51, a spring 79 biasing said pawl in a direction to engage the teeth of the ratchet wheel. A roller 80 on the pawl rides the gear hub 69 when the ratchet wheel and pawl are engaged. When the lug 70 on said hub engages said roller, the pawl is moved on its pivot to free the ratchet wheel. It is during this period of release of the wheel 71 that the continuous drive 26 is effective, through the described intermittent drive, to cause an intermittent advance of the shaft 61. Immediately that the lug 61 rides past the roller 71, the pawl spring 79 returns the pawl to ratchet-stopping engagement with the next oncoming tooth of the ratchet wheel. Thus, for each full revolution of the gear 60, the shaft 61 is advanced one-twelfth of a revolution, according to the number of teeth in wheel 71.

By means of bevel gearing 81 (FIG. 4), the intermittent advance of shaft 61 is imparted to shaft 62 and, therefore, to disc 28. Since gears 81 are miter gears, the mentioned one-twelfth advance of the disc 28 is effected for each one-twelfth advance of shaft 61.

The hold-down means 32 is shown as comprising a hold-down segment 82 that has a hub 83 in which bearing block 66 is disposed. Said segment has an arcuate seat 84 in which is fitted a ring 85 that overstands the peripheral portion of the disc 28, particularly the rivet seats 68 in said disc. Said ring 85 is provided with an annular depending flange or skirt 86 that serves to retain the rivets in their seats during index movement of the disc. As can best be seen in FIG. 4, the ring 85 constitutes a replaceable member that may be adjusted by the means 87 to have proper clearance with rivets in the seats 68. Said means, when adjusted as desired, is self-locking to insure clear passage of rivets without undue lateral or angular displacement thereof. Thus guided, the depending shanks of the rivets may be felt or probed to effect proper actuation of the means that insure discharge into chute 29 only of rivets that are properly provided with O-rings.

The supply of O-rings 33 comprises a vertically disposed rod 88 on which the rings are loosely strung. This rod may be separably connected at its upper end to a support standard 34 that, as best seen in FIG. 3, comprises an upper extension of a post 90 that connects to an ear 91 of the hold-down segment 82 to the base 25. Said post 90 holds the segment stationary while the disc 28 is being intermittently rotated. While the connection between said rod 88 and standard 34 is not shown, it will be clear that the connection is a separable one that enables stringing additional O-rings onto said rod from above as the same is depleted. The lower end of rod 88 is directed to guide O-rings 33 to the feed mechanism 35.

Said feed mechanism 35 is shown as comprising a support bracket 92 that is mounted on the wall 50 of the base 25. Said bracket is interiorly hollow and has an upper horizontal wall 93 in which an opening 94 is provided. The top face of the wall 93 is flat and is covered by a plate 95 in which longitudinal grooves 96 and 97 are provided. Racks 98 and 99 are respectively disposed and longitudinally movable in said grooves 96 and 97.

Reciprocative movement of said racks 98 and 99 is caused by the continuously driven shaft 58 of the continuous drive 26. Suitable cams 100 and 101 on said shaft 58 engage the cam followers 102 on the arms 103 of bellcranks 104 mounted to rock on a shaft 105 journalled in wall 52 of the base 25. Segment gears 106 and 107 on said bellcranks 104 are in respective mesh with the racks 98 and 99. The end of each arm 103 is connected to a tension spring 108 which biases the cranks 104 in a direction to move the racks toward the right—the feed direction. The mentioned cams 100 and 101 cause positive retractive movement of said racks toward the left.

The rack 98 is provided with a slide 109 that resides in a shallow groove in the plate 95. Said slide is formed, at its feed end, with a lateral offset 110 which is best seen in FIGS. 13 and 14. The rack 99 is provided with a feed slide 111 that slides on the top face of plate 95 and is disposed in a groove in a cover plate 112 on the top face of plate 95. The slides 109 and 111 are shown as in side-by-side relation with the offset 110 of the slide 109 beneath the feed end of the slide 111. The latter slide is provided with a ring-accommodating opening 113.

From FIGS. 9 and 13, it will be clear that the lowermost O-ring 33 of the supply thereof either rests upon the slide 111 or when opening 13 is in register with the rod 88, said O-ring falls into said opening and rests upon the offset 110 of the slide 109 therebeneath. Of course, the rod 88 terminates at its lower end above the slide 111 and a socket fitting 114 is provided on the cover plate 112 into which said rod end extends together with O-rings thereon.

The cams 100 and 101 hold the racks 98 and 99 retracted, the springs 108 causing feed projection of said racks and the slides 109 and 111 as permitted by said cams. Said cams are so designed as to move the slides together to a feed position beneath a rivet R in the disc 28 and to retract the slide 109 first so as to withdraw the offset 110 thereof from beneath an O-ring in the opening 113 of the slide 111 allowing said O-ring to fall from said opening. Thereafter, the slides may be retracted by the cams 100 and 101 to their initial position to receive another O-ring from the supply thereof.

The foregoing describes a feed operation that takes place only when a rivet R has been advanced to a position where the same may receive the O-ring so fed. However, the slide 111 is normally locked by the means 36 and cannot project to feed an O-ring under bias of springs 108 unless the lock is released by a rivet as the same is moving toward O-ring securing position. It will be seen that, if the slide 111 is locked, it is immaterial whether the slide 109 projects and retracts, since no feed of O-rings can occur. Thus, the means 36 is provided only for the slide 111.

Said means 36 (FIGS. 3 and 9) comprises a gear 115 in mesh with rack 99 and carried on a shaft 116 between a pair of brackets 117 affixed to the end of the support bracket 92. Said gear 115 is provided with a notch 118 which is normally engaged by the arm 119 of a release lever 120 pivoted at 121 on said brackets 117. The condition of FIG. 3 is maintained and the slide 111 is locked because of the engagement of arm 119 in the notch 118.

A push type solenoid 122 is provided for moving said lever to the gear-releasing position of FIG. 9, enabling the springs 108 to cause feed movement of the slide 111. A link 123 connects the core 124 of said solenoid with the lever 120, projection of said core moving said lever to unlock the means 36.

The solenoid 122 is controlled by the means 37 which comprises a switch 125 that is mounted on a bracket 126 affixed to post 90 and is provided with a feeler arm 127 that has an end 128 in the path of movement of a rivet R between the chute 27 and the station at which it receives an O-ring. In the absence of a rivet, said arm 127 is not actuated. Hence, the normally-open switch 125 will not close a circuit to the solenoid 122 and the means 36 will remain locked. A rivet in said path will actuate arm 127, close switch 125 and energize solenoid 122 to unlock the means 36 and allow springs 108 to move slide 111 in a feed direction. Subsequent retraction of the slide 111 will cause the means 36 to relock ready for the next operation by an oncoming rivet to actuate the control means 37.

The O-ring that had fallen from the opening 113 upon retraction of the slide part 110 was received by the means 38 which pushes said O-ring onto the shank of a rivet in register thereabove. Said means 38 is best seen in FIGS. 8, 9 and 15 and comprises a housing cylinder 129 affixed to the base wall 50 and having a piston 130, and a stem 131 extending upwardly from said piston and passing through a gland 132 that closes the upper end of said housing 129. The protruding end of the stem 131 carries a head 133 which in turn mounts a set of jaws 134 that are resiliently retained in position on said head by a ring 135. Said jaws 134, at their upper ends, are provided with a seat 136 (FIGS. 10 and 11) that receives an O-ring 33 as the same falls from the slide 111.

A fixed rod 137 extends axially through the piston and stem and through the jaws 134, the rod having a pointed or tapered upper end 138 to guide O-rings into the seat 136, when the jaws are retracted, as in FIGS. 9, 10 and 11.

The jaws 134 are spread by a rivet shank with which in register, as shown in FIG. 15, when compressed air is supplied to a pipe 139 that supplies said air to the lower portion of the cylinder housing 129 and acts on the piston 130 to project the same and the jaws 134 toward the rivet. It will be realized that the O-ring on seat 136 will thus be pushed onto the rivet shank and released from engagement with the jaws because of the spread condition of the same. Therefore, when compressed air is supplied through a pipe 140 to the upper end of the housing cylinder, the jaws will retract from the rivet and be restored to initial contracted position by the ring 135.

Since there is a force tending to push upwardly on the rivet, at the station where the same receives an O-ring, there is provided a pressure shoe 141 on the rivet head, the same being carried by the ring 85 and resiliently biased downwardly by a spring 142, compression of which may be adjusted, as desired.

The means 39 is similar in all respects to the means 38 except, as most clearly shown in FIG. 16, the rod 137 has been omitted and the jaws 134 are provided with a reduced annular end 143 instead of the seat 136. This shoulder pushes upwardly against an O-ring on the rivet and being small enough, enters the mentioned clearance 68a between the rivet shank and the seat 68. As a consequence, the means 39 is able to push the O-ring firmly into the mentioned groove in the head of the rivet. Air is provided for projection operation of the means 39 by a pipe 144 and for retraction by a pipe 145 that connects the housing cylinders of the means 38 and 39.

It will be noted from FIGS. 1 and 15 that the station where the O-rings are applied and the station where the O-ring is set up into the head are circumferentially spaced so that three indexing movements of the disc 28 occur to move a rivet from the applying station to the setting station.

The means 40 is located at the station next following the ring-setting station and is shown in FIGS. 1, 2, 5 and 6 as comprising a bracket 146 secured to the base wall 50 and mounting a pull type solenoid 147 that has a core 148 connected by a link 149 to a swing arm 150 on a vertical post 151 affixed to bracket 146. Said arm 150 is provided with an ejection stud 152 that is normally on the inward side of the path of movement of the rivets as they intermittently move therepast. However, if the solenoid 147 is energized, said stud 152 will push the rivet with which aligned out of its seat 68 and through an opening 153 in the skirt 86. Such an ejected rivet will be one without an O-ring since the means 41 that tests for such rings controls the operation of the means 40.

Said means 41 (FIGS. 1, 2 and 7) is shown as a bracket 154 affixed to the base wall 50 and provided with an upper inwardly directed arm 155 on which an upwardly directed backing stud 156 is provided. Said means further comprises a normally closed switch 157 that is shown as mounted on the cover plate 112. Said switch has contact arms 158 and 159 of which the latter is shown with a roller 160 that is normally disposed, when the contacts of said arms are engaged, to remain in position to allow a ringless rivet to move by between said roller and the backing stud 156. If there is an O-ring on the rivet, as shown in FIG. 7, the same by forcing the roller away will separate the contact arms 158 and 159.

The means 42 is shown in FIGS. 1 and 3 and in full detail in FIGS. 17, 18 and 19. The shaft 58, which also mounts the cams 100 and 101, is provided with a pinion gear 161 that is in driving mesh with a gear 162 on a stud shaft 163 extending from the base wall 52. Gear 162 is shown as three times the diameter of pinion gear 161. A hub 164 on gear 162 is provided with three uniformly spaced radial lugs 165. A normally-open switch 166 has an actuator 167 that is operated by said lugs as the gear 162 turns on the axis of stud 163. Thus, switch 166 is closed three times for each revolution of gear 162.

The gear 162 is positioned between a collar 168 affixed to the stud 163 and a cam 169 also affixed to the stud and having its cam face 170 directed toward the hub. A set of three uniformly arranged pins 171 are slidingly carried by the gear 162 to be shiftable transversely between engagement at one end with the cam face 170 and engagement at the opposite end by the projected core 172 of a solenoid 173. Said solenoid (FIGS. 1 and 3) is carried by a bracket 174 from base wall 52. It will be clear that for each full revolution of gear 162 each pin 171, if inwardly projected, will engage the cam face 170 and be projected thereby and that any pin so projected will remain in projected position because of the friction of springs 175 until inwardly projected by the core 172 upon energization of the solenoid 173.

From FIG. 17 it will be seen that the projected portions of said pins 171 are in position to close the normally-open switch 176 by moving the actuator 177 of said switch. Such actuation and closing of switch 176 can occur only if solenoid 173 had been energized.

From FIG. 20 it will be seen that the switches 157 and 166 are connected in series with the solenoid 173. Therefore, both switches will have to be closed to cause energization of solenoid 173. Since switch 157 is normally closed and will remain closed if a ringless rivet moves past, upon closing of switch 166 by a lug 165, the circuit to the solenoid 173 will be closed, causing the armature or core 172 thereof to push on a pin 171. Said pin is at the position 171a of FIG. 3. Because said pin is projected, when it reaches the actuator 177, it will close the switch 176. From FIG. 20 it will be clear that the rivet-ejecting solenoid 147 will be operated.

Since it required two full revolutions of the shaft 58 to move the pin 171a to the position 171b where it closes switch 176, the reason for the one to three ratio of gears 161 and 162 becomes evident. Thus, a ringless rivet being tested by the means 41 is not discharged until it reaches a position two stations beyond where such testing occurs. FIG. 1 clearly shows this relationship.

It will be evident that if the switch 157 is opened by an O-ring on the rivet, it is immaterial that a lug 165 closes the switch 166 for the circuit to the solenoid 173 will remain open and a pin at station 171a will remain retracted. Such a retracted pin cannot close switch 176 and the means 40 will not operate to eject a rivet. Accordingly, the rivet will be transported beyond the ejection station toward the discharge chute 29.

At the discharge station, a finger 177 pushes the rivets outwardly of the seats 68 and into the chute 29 and, because of the hereinbefore-described means, each rivet is properly provided with an O-ring in the head groove thereof.

The air for operating the means 38 and 39 may advantageously be provided through the medium of the means 43. The same is here shown as a valve 178 carried by a mounting plate 179 from the base wall 52, an actuator 180 on said valve and a cam 181 on the mentioned shaft 58 to operate the actuator and control flow of compressed air from an inlet 182 to outlets 183 and 184. By connecting pipe 183 to pipe 140, and pipe 184 to pipes 139 and 144, the cam 181 may control compressed air flow in proper synchrony with the desired operation of the means 38 and 39 in connection with index movement of the rivets.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described the invention, what is claimed and desired to be secured by Letters Patent is:

1. A machine for assembling an O-ring in a groove in the head of a rivet, said machine comprising means to intermittently feed rivets from station to station while supported by their heads with their shanks pendant, means to feed O-rings to a position beneath said rivets and in register with the shanks at one station of the feed, means to push an O-ring from said position onto a shank thereabove, means to simultaneously push the O-ring and set the same fully into the groove of a rivet at a station beyond the station where the rivet is provided with the O-ring, means to normally lock the O-ring-feeding means, and means at a station in advance of the station where the O-ring is provided and controlled by a rivet at said advanced station to release said lock means.

2. A machine according to claim 1 in which the O-ring-feeding means comprises superimposed slides, the upper of which has an opening in which an O-ring resides and said O-ring being supported by the lower slide, means to project said slides together to move an O-ring to the mentioned position of register with a rivet, means to retract the lower slide to release the O-ring to drop onto the O-ring-pushing means and to retract the upper slide, the mentioned lock means being provided only on the slide with the opening.

3. A machine according to claim 1 in which the ring-feeding means comprises superimposed slides the upper of which has an opening in which a ring resides and the lower slide supporting said ring, means to project the slides together to move a ring to the mentioned position of alignment with the shank of a head-provided member, means to retract the lower slide to release said ring to fall upon the ring-pushing means and to retract the upper slide, the mentioned lock means being provided on the slide with the opening.

4. A machine according to claim 1 in which the rivets are carried by an intermittently rotated disc and said disc is provided with seats that engage the heads of the rivets, there being a clear space between said seats and the rivet shanks to allow free passage of O-rings into the grooves in the rivet heads.

5. A machine according to claim 2 in which a fixed hold-down member overstands the station where the O-rings are applied and the station where the O-rings are set, said member being provided with resiliently biased elements that engage the rivet heads and resist upward displacement of the rivets during applying and setting of the O-rings.

6. A machine for assembling an O-ring in a groove in the head of a rivet, said machine comprising means to intermittently feed rivets from station to station while supported by their heads with their shanks pendant, means to feed O-rings to a position beneath said rivets and in register with the shanks at one station of the feed, means to push an O-ring from said position onto a shank thereabove, means to simultaneously push the O-ring and set the same fully into the groove of a rivet at a station beyond the station where the rivet is provided with the O-ring, means to normally lock the O-ring-feeding means, means at a station in advance of the station where the O-ring is provided and controlled by a rivet at said advanced station to release said lock means, means provided at a station beyond the O-ring-setting station to eject a rivet from said latter station, and means controlled by an O-ring on the shank of a rivet at a station between the O-ring-applying station and the O-ring-setting station to control said ejecting means according to whether an O-ring is in applied position at said control station.

7. A machine for assembling an O-ring in a groove in the head of a rivet, said machine comprising means to intermittently feed rivets from station to station while supported by their heads with their shanks pendant, means to feed O-rings to a position beneath said rivets and in register with the shanks at one station of the feed, means to push an O-ring from said position onto a shank thereabove, means to simultaneously push the O-ring and set the same fully into the groove of a rivet at a station beyond the station where the rivet is provided with the O-ring, means to normally lock the O-ring-feeding means, means at a station in advance of the station where the O-ring is provided and controlled by a rivet at said advanced station to release said lock means, means provided at a station beyond the O-ring-setting station to eject a rivet from said latter station, a normally-closed switch opened only by an O-ring positioned on the rivet at a station between the O-ring-applying station and the O-ring-setting station, and control means in electric circuit with said switch and with the rivet-ejecting means to operate the latter means only when the mentioned normally-closed switch remains closed.

8. A machine for assembling an O-ring in a groove in the head of a rivet, said machine comprising means to intermittently feed rivets from station to station while supported by their heads with their shanks pendant, means to feed O-rings to a position beneath said rivets and in register with the shanks at one station of the feed, means to push an O-ring from said position onto a shank thereabove, means to simultaneously push the O-ring and set the same fully into the groove of a rivet at a station beyond the station where the rivet is provided with the O-ring, means to normally lock the O-ring feeding means, means at a station in advance of the station where the O-ring is provided and controlled by a rivet at said advanced station to release said lock means, means provided at a station beyond the O-ring-setting station to eject a rivet from said latter station, a normally-closed switch opened only by an O-ring positioned on the rivet at a station between the O-ring-applying station and the O-ring-setting station, a normally-open switch connected in series with the normally-closed switch, cam means to close the normally-open switch in synchrony with the intermittent feed of rivets, and solenoid-operated means controlled by the latter switch and including a second normally-open switch, said second switch when closed being electrically connected to operate the rivet-ejecting means.

9. A machine according to claim 8 in which the solenoid-operated means includes a set of switch-operating elements that are successively moved by the mentioned solenoid to positions actuating the second switch to closed position, and cam means to move said elements to non-operating positions.

10. A machine according to claim 8 in which the solenoid-operated means includes a set of switch-operating elements that are successively moved by the mentioned solenoid to positions actuating the second switch to closed position, cam means to move said elements to non-operating positions, and a drive to advance said elements between a solenoid-operated position and a switch-operating position in synchrony with the intermittent feed movement of a rivet between the station where the same is tested for an O-ring and the ejecting station.

11. A machine for assembling an O-ring into a groove in the head of a rivet, said machine comprising a rotationally-mounted disc having peripheral seats therein, means to intermittently rotate said disc to move rivets disposed in said seats from a rivet-feeding station to a discharge station, means to feed O-rings to a position beneath one station between feed and discharge, means to push an O-ring thus fed onto a rivet at said station, means to simultaneously further push the O-ring and set the same into the groove of a rivet at a station beyond the O-ring-providing station, means to normally lock the O-ring-feeding means, and means at a station between the feed and rivet-providing stations and controlled by a rivet at the latter station to release said lock means, whereby feed of O-rings occurs only if a rivet is at said latter station and moving toward the O-ring-providing station.

12. A machine according to claim 11 in which a fixed hold-down member overstands the station where the O-rings are applied and the station where the O-rings are set, said member being provided with resiliently biased elements that engage the rivet heads and resist upward displacement of the rivets during applying and setting of the O-rings.

13. A machine according to claim 11 in which the O-ring-feeding means comprises superimposed slides, the upper of which has an opening in which an O-ring resides and said O-ring being supported by the lower slide, means to project said slides together to move an O-ring to the mentioned position of register with a rivet, means to retract the lower slide to release the O-ring to drop onto the O-ring-pushing means and to retract the upper slide, the mentioned lock means being provided only on the slide with the opening.

14. A machine according to claim 11 in which the O-ring-feeding means comprises superimposed slides, the upper of which has an opening in which an O-ring resides and said O-ring being supported by the lower slide, means to project said slides together to move an O-ring to the mentioned position of register with a rivet, means to retract the lower slide to release the O-ring to drop onto the O-ring-pushing means and to retract the upper slide, the mentioned lock means being provided only on the slide with the opening, means provided at a station beyond the O-ring-setting station to eject a rivet from said latter station, and means controlled by an O-ring on the shank of a rivet at a station between the O-ring-applying station and the O-ring-setting station to control said ejecting means according to whether an O-ring is in applied position at said control station.

15. A machine according to claim 11 in which the O-ring-feeding means comprises superimposed slides, the upper of which has an opening in which an O-ring resides and said O-ring being supported by the lower slide, means to project said slides together to move an O-ring to the mentioned position of register with a rivet, means to retract the lower slide to release the O-ring to drop onto the O-ring-pushing means and to retract the upper slide, the mentioned lock means being provided only on the slide with the opening, means provided at a station beyond the O-ring-setting station to eject a rivet from said latter station, means controlled by an O-ring on the shank of a rivet at a station between the O-ring-applying station and the O-ring-setting station to control said ejecting means according to whether an O-ring is in applied position at said control station, a normally-closed switch opened only by an O-ring positioned on the rivet at a station between the O-ring-applying station and the O-ring-setting station, and control means in electric circuit with said switch and with the rivet-ejecting means to operate the latter means only when the mentioned normally-closed switch remains closed.

16. A machine for assembling a ring on the shank of a head-provided member, said machine comprising means to intermittently feed such members from station to station while supported by their heads, means to feed rings to a position aligned with the shanks of the members at one station of the feed, means to push a ring from said position onto an aligned shank, means to simultaneously push the ring and set the same against the head of the member at a station beyond the station where the member is first provided with a ring, means to normally lock the ring-feeding means and means at a station in advance of the station where the ring is provided and controlled by a member at said advanced station to release said lock means.

17. A machine according to claim 16, in which the members are carried by an intermittently rotated disc and said disc is provided with seats that engage the heads of the members, there being a clear space between said seats and the shanks of the members to allow free passage of rings to a position against the heads of the members.

18. A machine according to claim 17 in which a fixed hold-down is provided at the station where the rings are first applied to the members and at the station where the rings are set, said hold-down being provided with resiliently biased elements that engage against the heads and thereby resiliently hold the members against endwise displacement during ring application and ring setting.

References Cited in the file of this patent

UNITED STATES PATENTS

| | | |
|---|---|---|
| 2,214,814 | Hambleton | Sept. 17, 1940 |
| 2,284,690 | Stern | June 2, 1942 |
| 2,303,225 | Olson | Nov. 24, 1942 |
| 2,613,374 | Gora | Oct. 14, 1952 |
| 2,728,091 | Hoenk | Dec. 27, 1955 |
| 2,878,556 | Heidergott | Mar. 24, 1959 |